United States Patent
Shen et al.

(10) Patent No.: US 7,363,394 B2
(45) Date of Patent: Apr. 22, 2008

(54) ID CONFIGURATION METHOD FOR ADVANCED PROGRAMMABLE INTERRUPT CONTROLLER

(75) Inventors: Jian Shen, Shanghai (CN); Fang Yuan, Shanghai (CN); Da-Sha Yang, Shanghai (CN)

(73) Assignee: Tyan Computer Corporation, Taipei (TW)

(*) Notice: Subject to any disclaimer, the term of this patent is extended or adjusted under 35 U.S.C. 154(b) by 254 days.

(21) Appl. No.: 11/335,586

(22) Filed: Jan. 20, 2006

(65) Prior Publication Data

US 2007/0067521 A1 Mar. 22, 2007

(30) Foreign Application Priority Data

Aug. 24, 2005 (TW) .............. 94129014 A

(51) Int. Cl.
*G06F 3/00* (2006.01)

(52) U.S. Cl. .............. 710/9; 710/104; 710/10; 713/2

(58) Field of Classification Search .............. 710/104, 710/8–10; 713/1, 2
See application file for complete search history.

(56) References Cited

U.S. PATENT DOCUMENTS

| | | | | |
|---|---|---|---|---|
| 5,495,569 A | * | 2/1996 | Kotzur | 714/2 |
| 6,167,512 A | * | 12/2000 | Tran | 713/2 |
| 7,010,678 B2 | * | 3/2006 | O'Shea et al. | 713/1 |

* cited by examiner

*Primary Examiner*—Clifford Knoll
(74) *Attorney, Agent, or Firm*—Muncy, Geissler, Olds & Lowe, PLLC

(57) ABSTRACT

An advanced programmable interrupt controller (APIC) identification (ID) configuration method is applied to a multiprocessor computer system. The method assigns a postponed ID to each CPU's APIC IDs respectively during the initialization. Plural reserved IDs are assigned to the I/O APICs. A multiprocessor configuration table in a basic input output system (BIOS) will be updated with renewed ID configuration, to avoid an ID conflict when processing the interrupt request from the peripheral devices and raise the stability of the multiprocessor computer system.

20 Claims, 4 Drawing Sheets

ID CONFIGURATION METHOD FOR ADVANCED PROGRAMMABLE INTERRUPT CONTROLLER

This Non-provisional application claims priority under 35 U.S.C. § 119(a) on Patent Application No(s). 094129014 filed in Taiwan on Aug. 24, 2005, the entire contents of which are hereby incorporated by reference.

BACKGROUND OF THE INVENTION

1. Field of Invention

The present invention relates to an Identification (ID) configuration method and particularly to a method of ID configuration for advanced programmable interrupt controller (APIC) in a multiprocessor computer system.

2. Related Art

As the coming of the information era, the computer system has become one of the essential instruments of people's life. In order to improve the processing efficiency of the computer system, a symmetrical multiprocessor (SMP) system has been developed in the recent years. When the computer system processes a task, the speed of performing the processing task by two processors in parallel is much faster than that by one single processor, similarly, when the processing task is performed by four processors in parallel, its speed is faster than that by two processors. And even when one processor among them is failed, other processors can take over its task to maintain the stability of the computer system. In view of the above advantages, the multiprocessor architecture is adopted by most of the large workstations or server systems For the system level, the multiprocessor system needs two advanced programmable interrupt controllers (APICs) to process the interrupt request (IRQ), in which one is a local APIC located in the central processor units (CPU), the other is an input/output APIC (I/O APIC) belonging to the I/O system, and the two may be connected to each other through an dedicated APIC bus. The local APIC is in charge of processing the local interrupts for the local processors, and may also accept and produce the interrupt request between the processors through the AIPC bus; and the I/O APIC uses a redirection table to redirect an interrupt request sending from one local APIC to another local APIC through the APIC bus.

However, the I/O APIC may also cause the system malfunction, and one of the causes is the ID assignment problem when there are a large number of processors.

When the computer system is powered on, the IDs stored in the register of each APIC will be set by a basic input output system (BIOS), and the APIC ID needs to be read from the MP configuration table to provide the information required by the operation to the operating system. The MP configuration table stored in the BIOS has its specific format convection, such as the MP configuration table following the Intel MP1.4 specification, i.e. using a specific multiprocessor and architecture.

Previously, in the BIOS, the parameter of the CPU's local APIC in the MP configuration table was set first, and its ID is set from 0, while the I/O APIC ID is arranged behind the last CPU's local APIC ID.

For example, when there are 8 dual-core CPUs in the computer system, IDs need to be assigned to 16 (8*2) local APICs, and IDs 0~15 are occupied by each local APIC sequentially, therefore, the I/O APIC IDs should be arranged from 16, and stored in the register of the I/O APIC chipset. But generally, I/O APIC only support the register with limited bits, e.g. the registers of two I/O APICs in the AMD 8131 bridge chip only support 4 bits respectively, that is, it is only possible to be set to 15 (0~15) at most. When the ID 16 is to be written into the first I/O APIC register, it will be written as 0000 (binary), the same with the first CPU's local APIC ID, as the entire 10000 (16 in the binary) can not be written into, and in that way, a conflict comes into being.

Therefore, how to provide an APIC ID configuration method becomes one of the problems to be solved by the researchers.

SUMMARY OF THE INVENTION

In view of the above problems, the present invention mainly relates to provide an APIC ID configuration method, in which the ID sequence of the CPU's APIC and I/O APIC is reassigned to solve the APIC ID conflict in the multiprocessor computer system and increase the stability of processing the interrupt request.

In the APIC ID configuration method disclosed in a preferred embodiment of the present invention, a postponed ID is assigned to each CPU's local APIC, respectively. The value of each postponed. ID is not smaller than the number of plural reserved IDs. And the number of the reserved IDs is not smaller than the number of plural I/O APIC. Then, reserved IDs are assigned to each I/O APIC respectively.

In another preferred embodiment of the present invention, it further comprises the step of storing the assigned reserved IDs in a register of each I/O APIC, respectively; additionally, the reserved IDs are selected from a group consisting of the positive integers from 0 to $(2^x-1)$, wherein x is the number of bits supported by the register of each I/O APIC. Furthermore, it comprises the step of storing each postponed ID in another register of each local APIC; additionally, the postponed IDs are selected from a group consisting of the positive integers from $2^x$ to $(2^y-1)$, wherein y is the number of bits supported by the register of each local APIC, and x<y.

Furthermore, in a preferred embodiment of the present invention, the postponed IDs are written into the MP configuration table, i.e. the corresponding local APIC ID entry; and the assigned reserved IDs are written into the MP configuration table, i.e. a plurality of corresponding I/O APIC ID entries; while the MP configuration table is stored in the BIOS of the computer system.

And in yet another preferred embodiment of the present invention, the number of the reserved IDs is not smaller than the number of the I/O APICs.

In a preferred embodiment of the present invention, the step of assigning the postponed IDs further comprises: assigning the smallest one of the postponed IDs to one of the local APICs first; and then increasing the smallest ID by 1 successively and assigning them to other local APICs one by one.

In a preferred embodiment of the present invention, an original ID has been assigned to each CPU's local APIC before the postponed IDs are assigned; and in the step of assigning the postponed IDs, each postponed ID is obtained by adding the original ID of each local APIC with the number of the reserved IDs.

The characteristics and implementations related to the present invention will be illustrated in details hereinbelow through the most preferable embodiments combined with the accompanying drawings.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

The present invention solves the ID assignment conflict in conventional techniques by taking measures in the sequence of assigning APIC ID.

Figure 1:
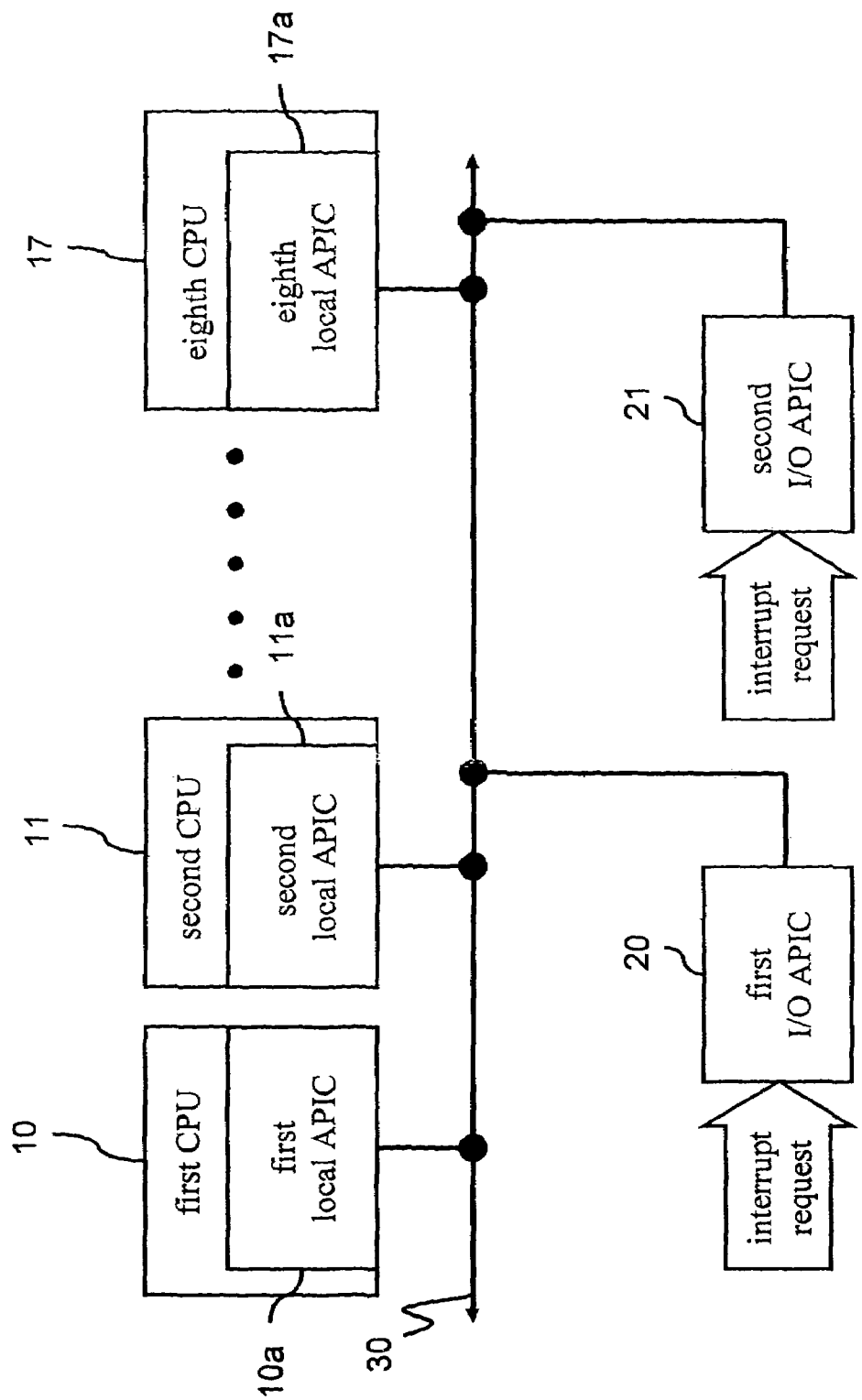
FIG. 1 is a system block diagram of a preferred embodiment of the present invention.

Referring to FIG. 1, which is a system block diagram illustrating a computer system with 8 single-core CPUs in accordance with a preferred embodiment of the present invention. In FIG. 1 the first CPU 10, the second CPU 11 . . . and the eighth CPU 17 have a dedicated first local advanced programmable interrupt controller (hereinafter referred as first local APIC) 10a, a second local advanced programmable interrupt controller (hereinafter referred as second local APIC) 11a . . . and an eighth local advanced programmable interrupt controller (hereinafter referred as local APIC) 17a respectively to process the interrupt request for each CPU. Meanwhile, the first local APIC 10a, the second local APIC 11a . . . and the eighth local APIC 17a all communicate with the first and second input/output advanced programmable interrupt controllers (hereinafter referred as I/O APIC) 20, 21 and process the interrupt request from each peripheral through the front side bus 30. In practice, the I/O APIC and the local APIC can also be connected by an APIC bus, ICC bus (Interrupt Controller Communications Bus) and the like; the I/O APICs 20, 21 may be integrated on a single chip, e.g. there are 2 I/O APICs in the AMD 8131 bridge chip.

Furthermore, the first and second I/O APICs 20, 21 and the first local APIC 10a, the second local APIC 11a . . . and the eighth local APIC 17a in the CPUs have their dedicated registers (not shown) for storing individual IDs. The register of I/O APIC in the present embodiment supports the storing of 4-bit ID, while the register of local APIC in each CPU provides 8 bits. In other words, the register of I/O APIC can only store the ID values of 0~15, and cannot store the value larger than 16, but the local APIC can store the ID values of (0~255).

Figure 2:
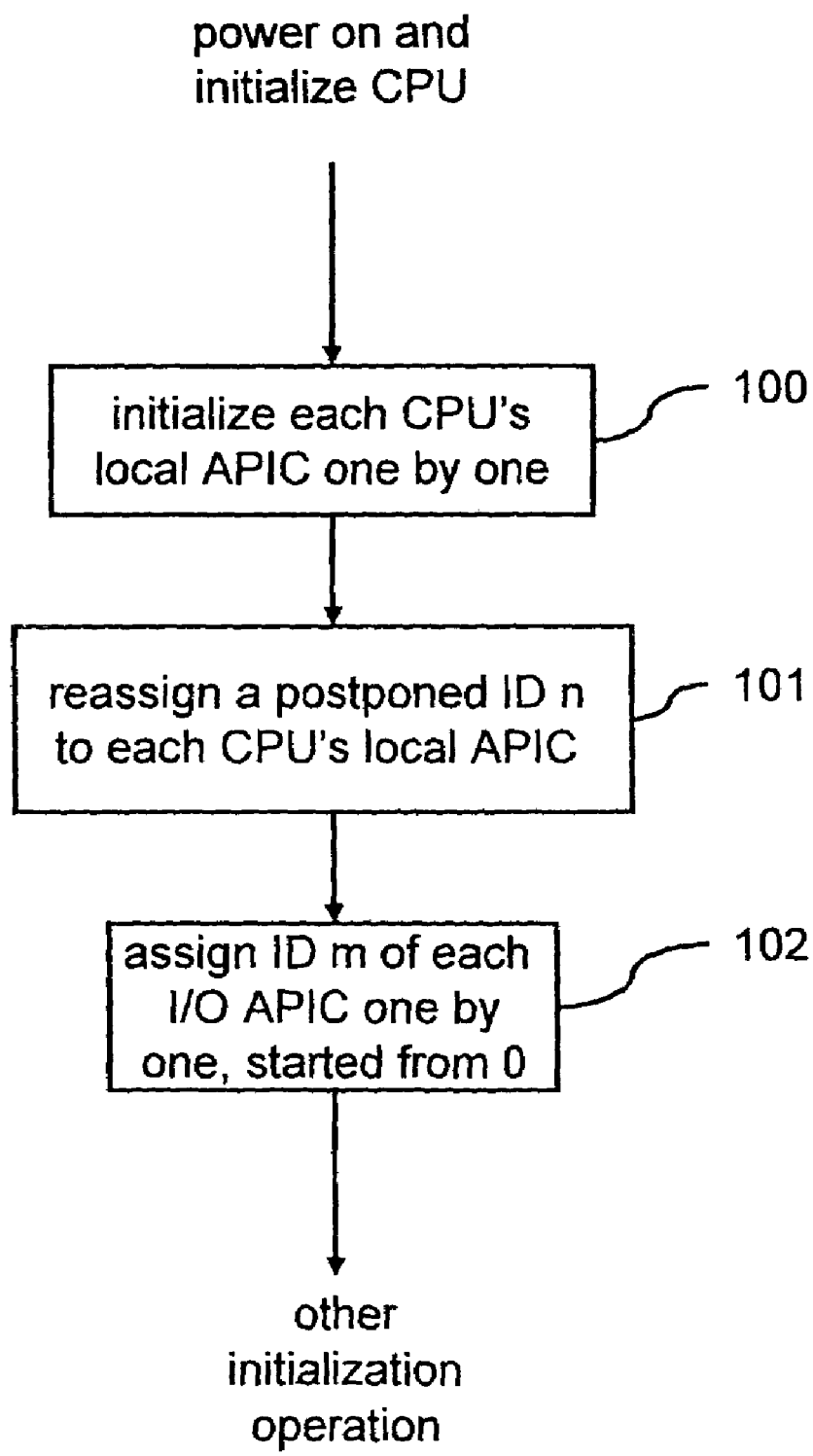
FIG. 2 is a main flow chart of an APIC ID configuration method according to the preferred embodiment of the present invention.

Referring to FIG. 2, it is a main flow chart of the APIC ID configuration method according to the preferred embodiment of the present invention. The ID assignment will become a bulky and fussy project of correcting the BIOS if the CPU initialization is influenced by the assignment; therefore, the present embodiment performs the reassignment of the APIC ID without changing the initialization procedure of CPU.

First, the initialization of CPU is performed when powered on, and each CPU's local APIC is initialized one by one (Step 100); this part follows the general procedure to enable each CPU's local APIC and complete the ID assignment procedure.

An original ID $n_0$ is assigned to the initialized local APICs respectively, and these original IDs $n_0$ may occupy part or all of the values of 0~15, which cannot be supported by the register of I/O APIC, thus a postponed ID n should be reassigned to each CPU's local APIC (Step 101). Besides, the value of each postponed ID is not smaller than the number of plural reserved IDs. And the number of the reserved IDs is not smaller than the number of plural I/O APIC. The value of the postponed ID n can be a value obtained by adding the original ID $n_0$ with the number of the I/O APICs, or by adding the original ID $n_0$ directly with 16, that is, the values of 0~15 are used for the I/O APICs.

The assigning process of postponed IDs includes updating ID values of the local APIC in each register and updating the MP configuration table (Multiprocessor configuration table) written into the BIOS; the two need not to be performed in order of precedence. The MP configuration table includes data entries required by a great variety of operation systems, including the interrupt entry, the bus entry and the like, besides the IDs of the I/O APIC and the local APIC; whether the operation system can be operated normally or not depends on whether the MP configuration table is correct or not.

And then, the ID m of each I/O APIC is assigned one by one, started from 0 (Step 102). Since it is started from 0, there are 16 I/O APIC IDs allowed, which is too many to most of the computer systems, and thus 16 IDs is a safe for the I/O APICs. The assignment may first assigning the IDs m of the I/O APICs in the MP configuration table directly, and thereby storing them in the register of I/O APIC.

Of course, the exact value of the assigned ID is associated with the number of bits supported by the register. If the largest ID value supported by the number of bits of the register is taken as a safe configuration, the ID value assigned to the I/O APIC is between 0 to $(2^x-1)$, and the postponed ID n to be used by the local APIC is between $2^x$ to $(2^y-1)$, wherein x and y are the numbers of ID bits supported by the registers of the I/O APIC and the local APIC respectively, and x<y.

Figure 3A:
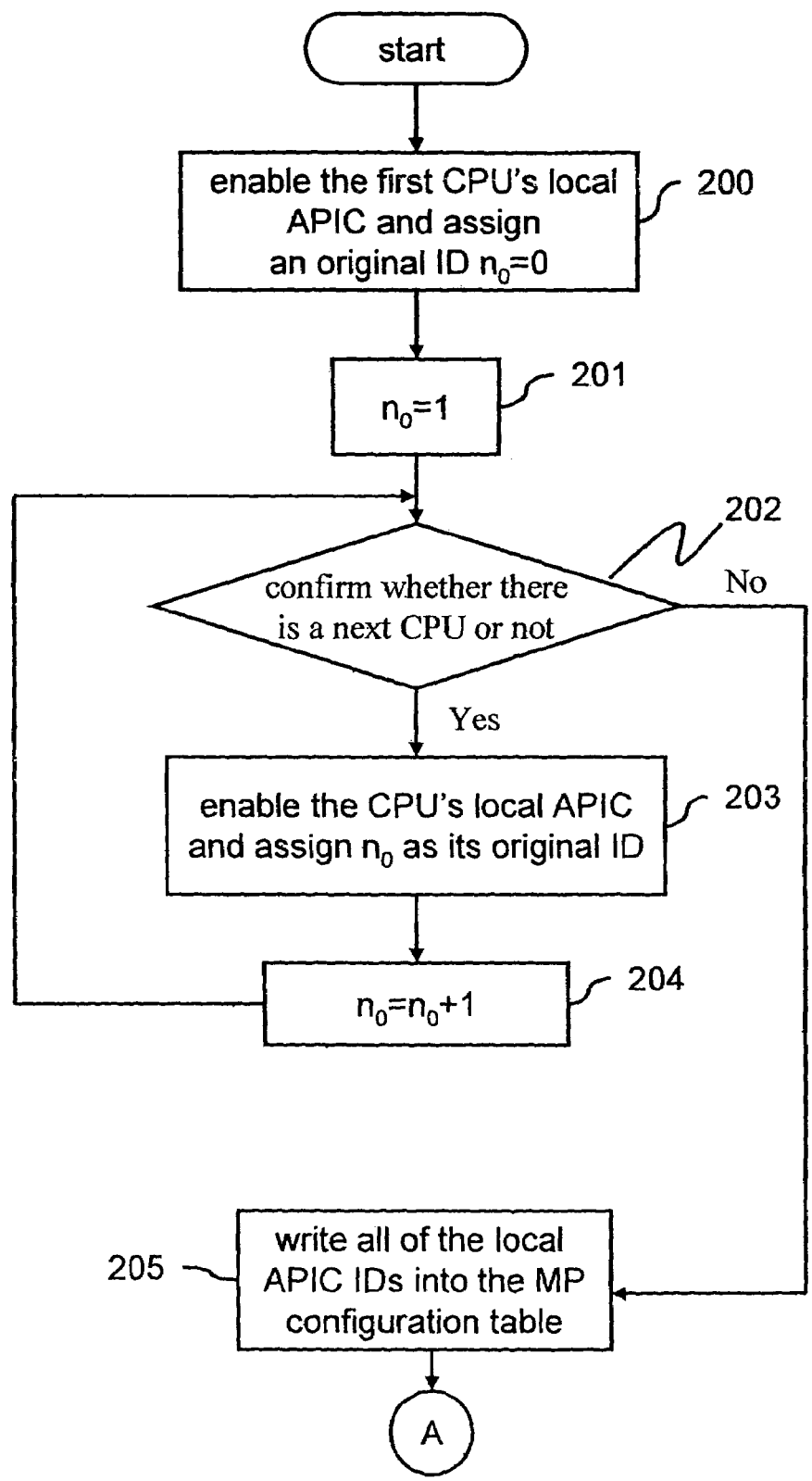
FIG. 3A is a detailed flow chart of the APIC ID configuration method according to the preferred embodiment of the present invention.
Figure 3B:
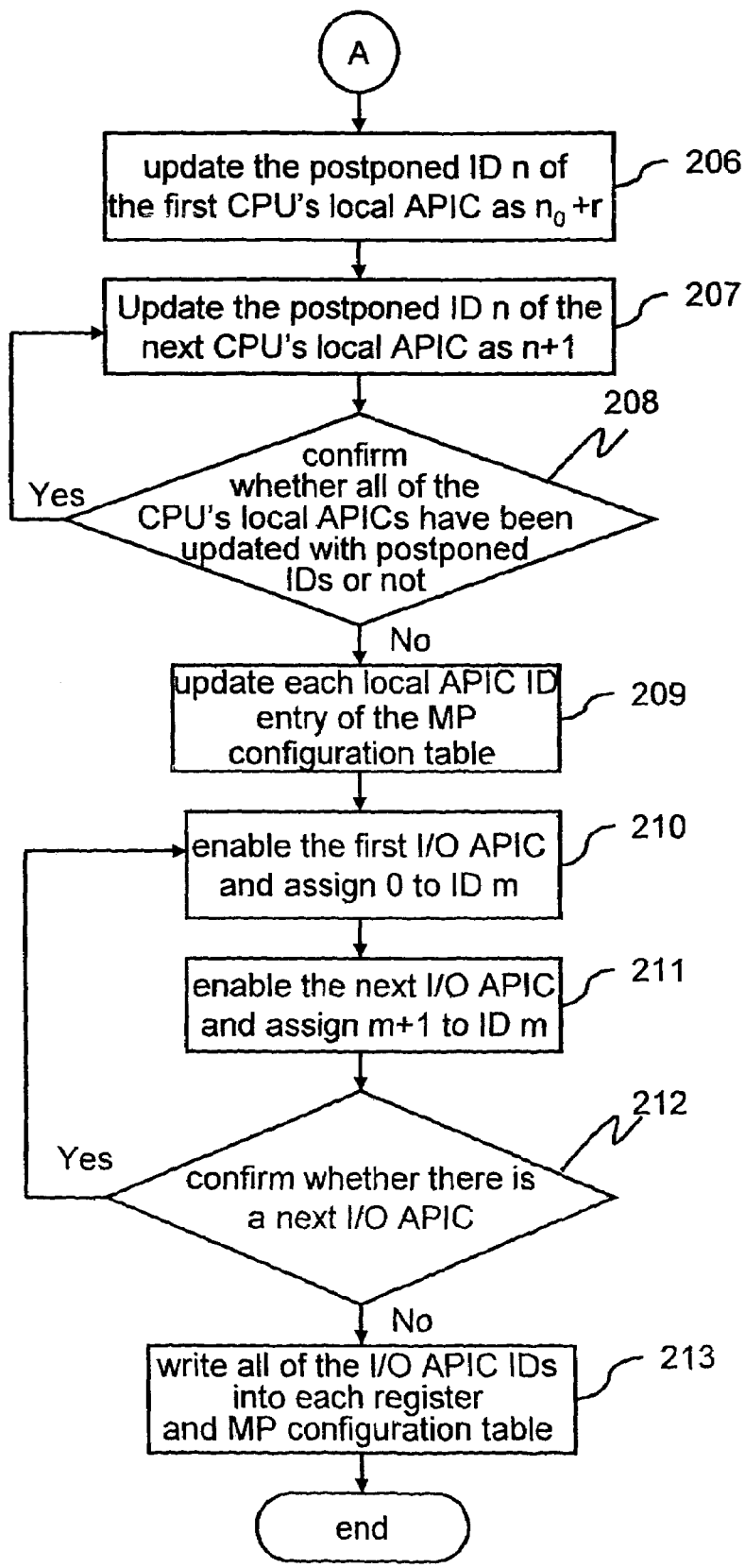
FIG. 3B is a detailed flow chart of the APIC ID configuration method continuing FIG. 3A.

Next, referring to FIG. 3A and FIG. 3B, they are the detailed flow charts of the APIC ID configuration method according to a preferred embodiment of the present invention.

After the general initialization procedure of the CPU, the first local APIC 10a, the second local APIC 11a . . . and the eighth local APIC 17a located in each. CPU will be enabled one by one, and an original ID $n_0$ of 0~15 will be assigned; its process is shown in FIG. 3A. First, in Step 200, the first CPU's local APIC is enabled and an original ID $n_0$1 is assigned to it, that is, the first local APIC 10a of the first CPU 10 is enabled, and at that time, the original ID value $n_0$ assigned to the first local APIC 10a is 0, and is stored in its dedicated register.

Then, the original ID $n_0$ is set to 1 (Step 201), and the original IDs of all local APICs are enabled and assigned one by one by using a program loop. First, confirm whether there is a next CPU (Step 202), and the CPU's local APIC is enabled and an original ID $n_0$ is assigned to its dedicated register as an original ID (Step 203). When performing Step 202 for the first time, the second CPU 11 will be found first, its second APIC 11a is enabled, and the original ID $n_0$ will be assigned the present value 1 and stored in its dedicated register. Then, the original ID $n_0$ is set to $n_0+1$ (Step 204), and the process return to Step 202 to look for the next CPU until the eighth local APIC 17a of the eighth CPU 17 is enabled and its ID assignment is completed, with the eighth local APIC 17a's original ID $n_0=7$. Each processor of the present embodiment is a single-core processor, so only one local APIC is provided for each processor respectively; for a dual-core processor, an individual local APIC is needed to process the interrupt request for each core. Therefore, in the dual-core 8-processor system, there are a total of 16 local APICs, and 16 IDs of 0~15 will be occupied initially.

When there is no next CPU, all of the local APIC IDs are written into the MP configuration table (Step 205); and at that time, the local APIC entry in the MP configuration table will be created one by one according to the IDs stored in each dedicated register of the first local APIC 10a, the second local APIC 11a . . . and the eighth local APIC 17a.

Referring to FIG. 3B, it continues the steps of FIG. 3A. First, the postponed ID n of the first CPU's local APIC is updated to $n_0+r$ (Step 206), wherein r is the number of the reserved IDs. 0 to (r−1) are reserved for the I/O APICs, and generally, the number of the reserved IDs may be equal to the number of the I/O APICs, or $2^x$ IDs may be reserved, wherein x is the number of ID bits supported by the I/O APIC register. For the two I/O APICs of the present embodiment that can support the storing of 4-bit ID, 2 IDs 0, 1 (r=2) may be reserved, or $r=2^4=16$ IDs, i.e. 0 to 15, may be reserved.

Then, all other local APIC IDs are updated one by one also by using a program loop. The postponed ID n of the next CPU's local APIC is updated to n+1 (Step 207). For the second local APIC 11a to the eighth local APIC 17a, they may be updated in the manner of n=n+1, simply taking the postponed ID of the first local APIC as a reference; of course, they may also be updated in the manner of $n=n_0+r$, that is, the individual postponed ID is obtained by adding the individual original ID with 2 or 16 (depending on the number of the reserved IDs), respectively. And then, whether all the CPU's local APICs have been updated to postponed IDs or not is determined (Step 208). If not, it returns to the previous step to continue the updating. After all of the local APIC registers are updated, it begins to update each local APIC ID entry of the MP configuration table (Step 209).

Then, the first I/O APIC is enabled and ID m=0 is assigned to it (Step 210), that is, the first I/O APIC 20 is enabled and 0 is assigned to its ID. Then, the next I/O APIC is enabled and ID m=m+1 is assigned to it (Step 211), that is, the second I/O APIC 21 is enabled and m=0+1=1 is assigned to its ID. Afterwards, find out whether there is a next I/O APIC (Step 212). For the case of more than two I/O APICs, the process returns to Step 210 to continue the initialization. Finally, all of the I/O APIC IDs are written into the individual register and MP configuration table (Step 213).

Of course, the I/O APIC can use all reserved IDs randomly, not limited to begin from 0 or use continually. Further, the present invention is not limited to be performed in the initialization after powered on, and may also enter BIOS in other state to reassign the ID through suitable program arrangement, so as to correct the error in time.

The APIC ID configuration method disclosed in the present invention set the I/O APIC IDs before the CPU's local APIC to avoid the ID conflict. The adjustment is carried out by reassigning each local APIC ID and reserving the ID of smaller value for the I/O APIC, to effectively avoid the conflict when the operation system reads the IDs, and the stability of the computer system is thereby improved.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An Identification (ID) configuration method applied to a computer system with a plurality of central processor units (CPUs), wherein each CPU has at least one local advanced programmable interrupt controller (APIC) for communication with a plurality of input/output (I/O) APICs in the computer system to process interrupt requests, the method comprising the steps of:
   assigning a postponed ID to each local APIC of the CPUs respectively, the value of each postponed ID being not smaller than the number of a plurality of reserved IDs and the number of the reserved IDs being not smaller than the number of the I/O APICs; and
   assigning the reserved IDs to the I/O APICs;
   wherein the postponed IDs and the assigned reserved IDs are written into a multiprocessor (MP) configuration table in a BIOS of the computer system.

2. The ID configuration method of claim 1, further comprising the step of storing the assigned reserved IDs in a register of each I/O APIC respectively.

3. The ID configuration method of claim 2, wherein the reserved IDs are selected from a group consisting of the positive integers from 0 to $(2^x-1)$, wherein x is the number of bits supported by the register of each I/O APIC.

4. The ID configuration method of claim 3, further comprising the step of storing each postponed ID in another register of each local APIC.

5. The ID configuration method of claim 4, wherein the postponed IDs are selected from a group consisting of the positive integers from $2^x$ to $(2^y-1)$, wherein y is the number of bits supported by the register of each local APIC, and x<y.

6. The ID configuration method of claim 1, wherein the postponed IDs and the assigned reserved IDs are written into a plurality of corresponding local APIC ID entries and a plurality of I/O APIC ID entries in the MP configuration table.

7. The ID configuration method of claim 1, wherein the number of the reserved IDs is equal to the number of the I/O APICs.

8. The ID configuration method of claim 1, where the step of assigning each postponed ID further comprises:
   assigning the smallest one of the postponed IDs to one of the local APICs first; and
   increasing the smallest postponed ID by 1 successively, and assigning them to the rest of the local APICs one by one.

9. The ID configuration method of claim 1, wherein an original ID has been assigned to each local APIC of the CPUs respectively before the postponed IDs are assigned.

10. The ID configuration method of claim 9, wherein in the step of assigning the postponed IDs, each postponed ID is obtained by adding the original ID of each local APIC with the number of the reserved IDs.

11. An APIC ID configuration method applied to a computer system with a plurality of CPUs, wherein each CPU has at least one local APIC for communication with a plurality of I/O APICs in the computer system to process interrupt request, the method comprising the steps of:

assigning a postponed ID to each local APIC of the CPUs respectively, the value of each postponed ID being not smaller than the number of a plurality of reserved IDs, the number of the reserved IDs being not smaller than the number of the I/O APICs; and assigning the reserved IDs to the I/O APICs.

12. The ID configuration method of claim 11, further comprising the step of storing the assigned reserved IDs in a register of each I/O APIC.

13. The ID configuration method of claim 12, wherein the reserved IDs are selected from a group consisting of the positive integers from 0 to (2x−1), wherein x is the number of bits supported by the register of each I/O APIC.

14. The ID configuration method of claim 13, further comprising the step of storing each postponed ID in another register of each local APIC.

15. The ID configuration method of claim 14, wherein the postponed IDs are selected from a group consisting of the positive integers from 2x to (2y−1), wherein y is the number of bits supported by the register of each local APIC, and x<y.

16. The ID configuration method of claim 11, wherein the postponed IDs are written into a plurality of corresponding local APIC ID entries in a MP configuration table, and the assigned reserved IDs are written into a plurality of I/O APIC ID entries in the MP configuration table; the MP configuration table is stored in a BIOS of the computer system.

17. The ID configuration method of claim 11, wherein the number of the reserved IDs is equal to the number of the I/O APICs.

18. The ID configuration method of claim 11, wherein the step of assigning each postponed ID further comprises:

assigning the smallest one of the postponed IDs to one of the local APICs first; and increasing the smallest postponed ID by 1 successively, and assigning to the rest of the local APICs one by one.

19. The ID configuration method of claim 11, wherein an original ID has been assigned to each local APIC of the CPUs respectively before the postponed IDs are assigned.

20. The ID configuration method of claim 19, wherein in the step of assigning the postponed IDs, each postponed ID is obtained by adding the original ID of each local APIC with the number of the reserved IDs.

* * * * *